July 16, 1940.　　　　J. H. SCHREIBER　　　　2,208,197
JOINT BREAKER AND CATHEAD
Filed June 16, 1937　　　3 Sheets-Sheet 2
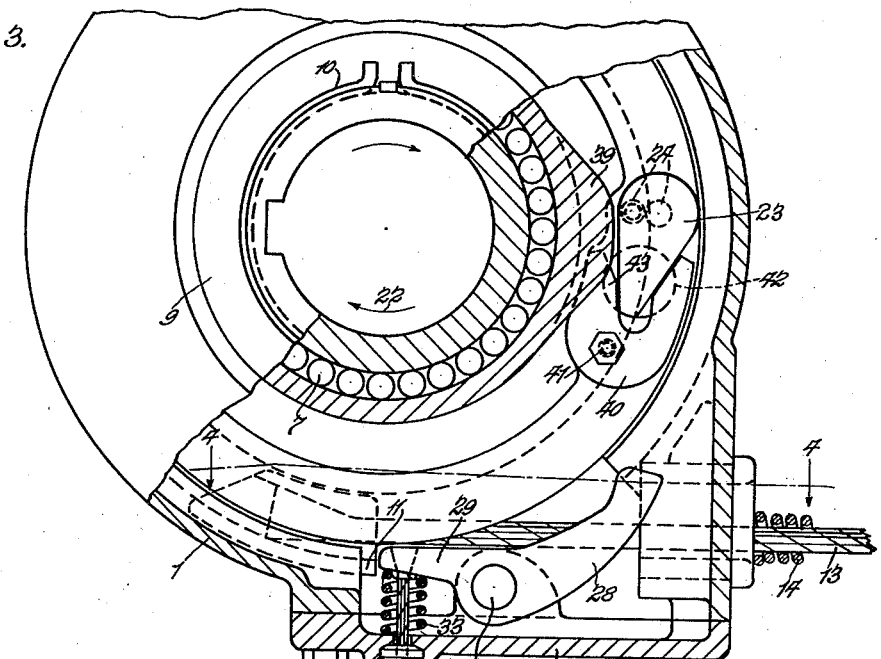
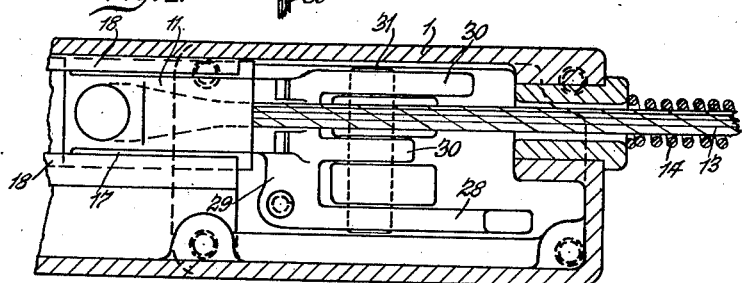
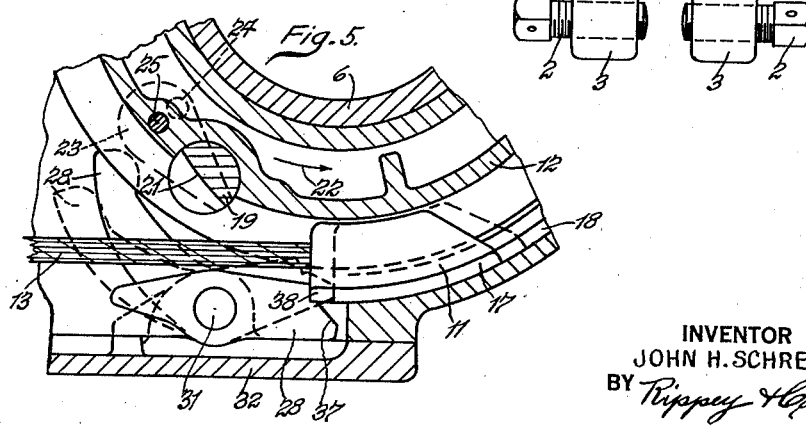
INVENTOR
JOHN H. SCHREIBER
BY *Rippey & Cassidy*
HIS ATTORNEYS.

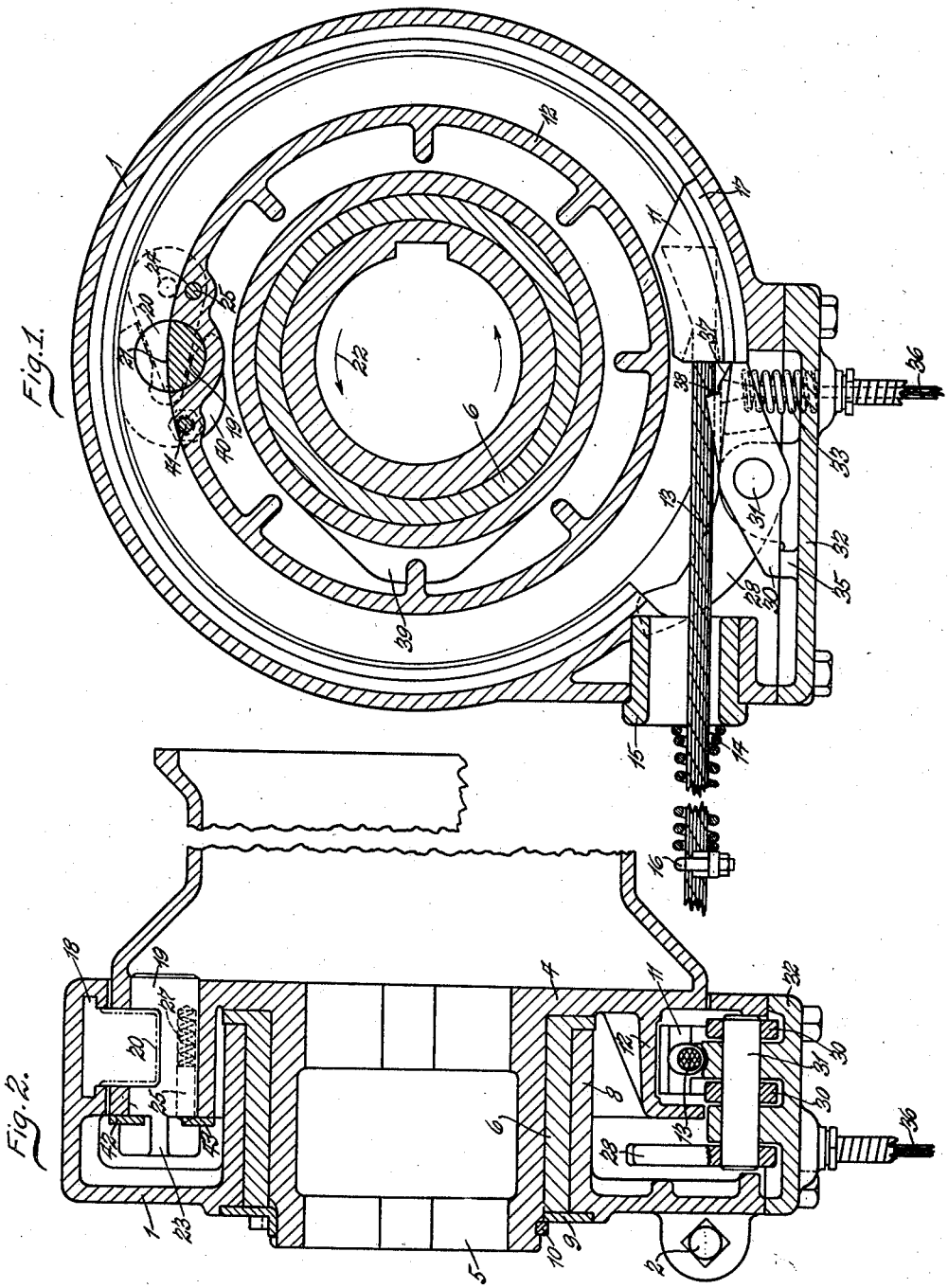

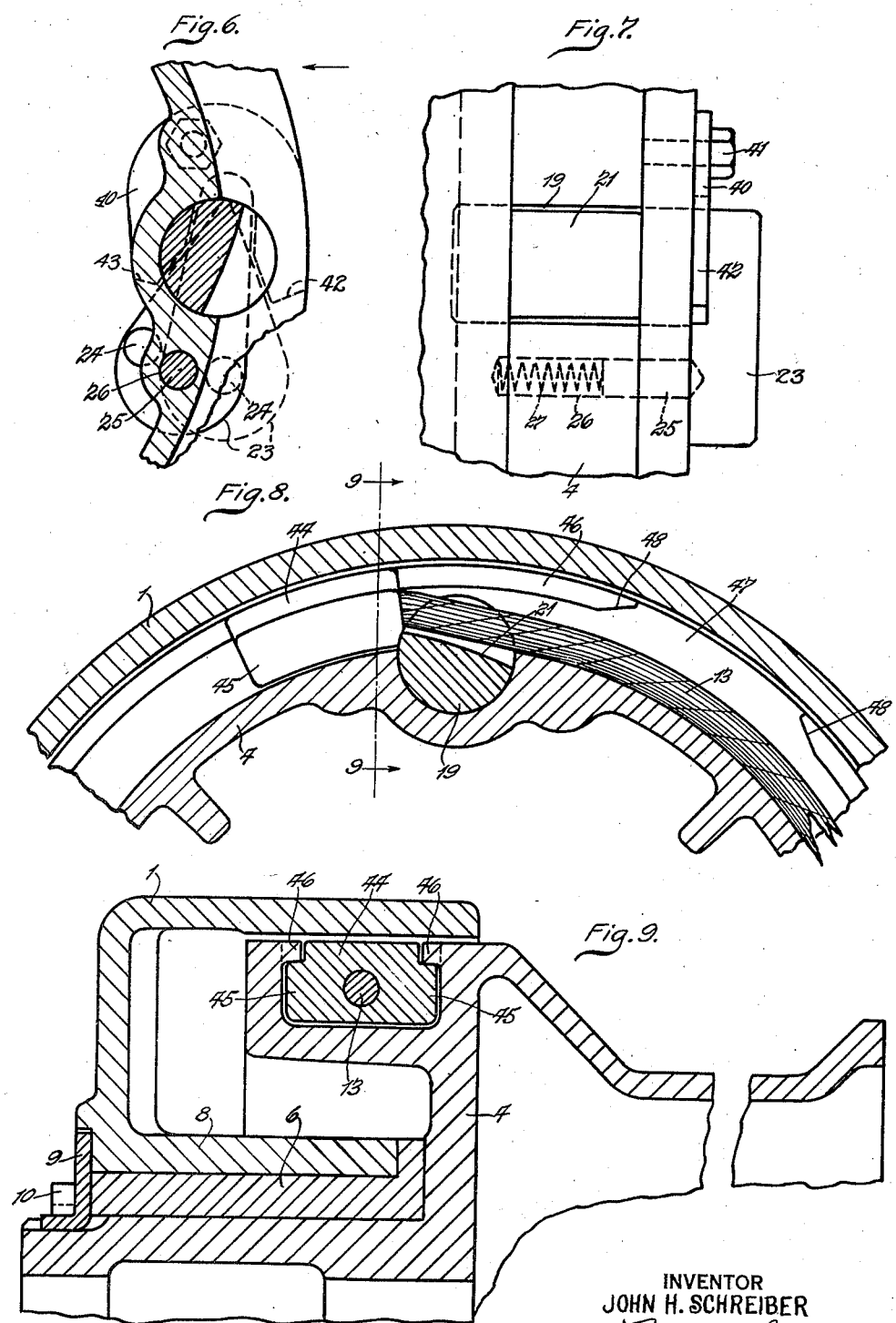

Patented July 16, 1940

2,208,197

UNITED STATES PATENT OFFICE 2,208,197

JOINT BREAKER AND CATHEAD

John H. Schreiber, St. Louis, Mo.

Application June 16, 1937, Serial No. 148,493

23 Claims. (Cl. 254—173)

This invention relates to joint breakers and catheads, and has special reference to mechanisms for use in oil fields and elsewhere for breaking the joints between pipe sections.

Objects of the invention are to provide a mechanism for the purpose stated in which the operating elements become engaged to perform the intended functions with a minimum degree of impact, and which continue to operate during the performance of their functions with less degree of frictional or other mechanical resistance than in other mechanisms at present in general use for breaking the joints between pipe sections; to provide a mechanism of this character which is positive in action and which is of comparatively simple construction and characterized by safety in operation and durability; to provide a mechanism which may be controlled and started by the operator by a simple operation that is entirely safe and without sudden and unsafe impacts or engagement of the parts which are alternately engaged and disengaged; to provide a mechanism of this kind in which the forces to which the jerk line are subjected are applied directly through attached parts to the rotary draw-works line shaft; and to provide a simplified mechanism of this character which is self-contained and may be easily installed and removed.

Other objects of this invention should be apparent from the following description, reference being made to the annexed drawings, in which—

Fig. 1 is a sectional view of the device transversely of the draw-works shaft.

Fig. 2 is a sectional view taken parallel with the axis of the draw-works shaft.

Fig. 3 is a view partly in section looking in the opposite direction from Fig. 1 and showing anti-friction bearings for supporting the stationary housing of the device.

Fig. 4 is a sectional view approximately on the line 4—4 of Fig. 3.

Fig. 5 is a sectional view similar to the lower portion of Fig. 1 but showing the shoe engaged with the lever device that operates the actuator to position to engage the shoe.

Fig. 6 is a view enlarged relatively to the preceding views of the drawings showing the actuator in position to engage the shoe.

Fig. 7 is an elevation looking toward the right side of Fig. 6.

Fig. 8 is an enlarged sectional view similar to the upper portion of Fig. 1 showing the shoe supported wholly by the rotary part of the mechanism and in engagement with the actuator therefor.

Fig. 9 is a sectional view on the line 9—9 of Fig. 8.

A stationary housing 1 may be rigidly attached to any appropriate projection on the draw-works by set screws 2 mounted in lugs 3 and operative into and out of rigid clamping engagement with such projection. A rotary element 4 which cooperates with the stationary housing to enclose between them parts comprised within the present invention has an opening 5 to receive a portion of the draw-works shaft to which said part 4 is rigidly secured. A bushing 6 (Figs. 1 and 2) or anti-friction bearings 7 (Fig. 3) may be mounted between the hub of the rotary member 4 and the tubular part 8 of the stationary housing so as to support said parts in proper cooperative relationship. A washer 9 is mounted on the end of the hub of the part 4 against the end of the bushing 6 (Fig. 2) or in position to confine the anti-friction bearings 7 (Fig. 3), and is held thereon by a resilient split ring 10 engaged in a circumferential groove on the hub of the part 4. Thus, the stationary housing and the part 4 are held in proper cooperative relationship, leaving said part 4 free to rotate while the housing 1 remains stationary.

As shown in Figs. 1 to 5, inclusive, a shoe 11 is mounted for operation between the housing 1 and the annular part or drum 12 of the rotary member 4, and is rigidly attached to the end of the jerk line 13. A spring 14 (Fig. 1) is mounted on the jerk line 13 and has one end bearing against a part 15 of the stationary housing and its opposite or outer end bearing against an abutment 16 rigidly attached to the jerk line. The energy of said spring is utilized to actuate the jerk line in the direction away from the stationary housing and to draw the shoe 11 to the position shown in Fig. 1, and thereafter, at the proper time, to the position shown in Fig. 5. The shoe 11 has flanges 17 operating in guides 18 in the stationary housing.

An actuator comprising a body 19 having in one side thereof a notch 20 is mounted for rocking movements in the rotary member 4, and the bottom wall 21 of said actuator is arcuate and has the same radius of curvature as the periphery of the annular part 12 of the rotary member 4. The body 19 is cylindrical and its axis is approximately on and at the center of the arcuate wall 21 so that, when said body is turned to the position shown in Fig. 1, said wall 21 is in continuation of the peripheral wall of the annular part 12; and, when said body is turned to the position shown in Figs. 5 and 6, the wall 21 is angularly disposed and the forward edge of said body 19 at the intersection of the wall 21 with the periphery of said body constitutes a shoulder extending beyond the periphery of the annular part far enough to engage the shoe 11 during rotation of the rotary member 4 in the direction of the arrows 22 (Figs. 1, 3 and 5).

A cam lever or rock arm 23 is formed integral or rigid with the body 19, and has therein a pair of indentations 24 adapted to receive alternately the outer end of a latch pin 25 mounted in a well 26 in the rotary member 4 and actuated by a spring 27 contained in said well into latching engagement with the respective indentations 24. When the latch 25 is engaged with one of said indentations, it yieldingly holds the body 19 in the position shown in Fig. 1; and, when said latch pin is engaged in the other one of said indentations, it yieldingly holds the body 19 in the position shown in Figs. 5 and 6. When the body 19 is in the position shown in Fig. 1, the rotary member 4 can continue to rotate without moving the shoe 11 and the jerk line 13; but, when the actuator is in the position shown in Figs. 5 and 6, it will engage the shoe 11 and move the same along with the rotary member 4, and thereby operate the jerk line 13 which had previously been attached to the pipe tongs (not shown) in the usual manner.

A cam lever 28 is formed rigid with a part 29 having a number of arms 30 which, together with the cam lever 28, are mounted on a pivot 31 supported by a removable and replaceable plate 32 rigidly attached to the stationary housing 1. A spring 33 mounted between the part 29 and the plate 32 actuates the cam lever 28 to the position shown in Figs. 1 and 3 in which an arm 30 of said lever engages an abutment 35 on the rigid plate 32. In this position, the rotary member on which the cam lever 23 is mounted may rotate constantly in the direction of the arrows 22 without the cam lever 28 engaging the cam lever 23. However, the cam lever 28 may be moved from the broken line position shown in Fig. 5 to the solid line position, in which latter position said cam lever 28 will be engaged by the cam lever 23 and will move the cam lever 23, and thereby the actuator 19, to position shown in Fig. 5, in which said actuator, after slight additional movement, will engage the shoe 11, and thereby move said shoe along with the rotary member 4 and operate the jerk line 13, and thereby the pipe tongs, to break the joint between attached sections of pipe.

For moving the cam lever 28 to position to be engaged by the cam lever 23, a control line 36 is attached to the part 29 so that outward movement of said line 36 will move said part 29 in opposition to the spring 33. While the rotary member 4 is rotating, the operator quickly jerks and releases the control line 36. This moves the cam 28 to the solid line position shown in Fig. 5 in which it will operate the actuator 19 during rotation of the rotary member 4. The actuator 19 is, therefore, moved to position preparatory for engagement with the shoe 11, and engagement with said shoe is effected regardless of the speed at which the control line is moved by the operator. Less effort and skill is required on the part of the operator than would be required if the control line 36 would act directly on the actuator 19.

Immediately upon movement of the part 29 by the control line 36 as described, the spring 14 moves the jerk line 13 outwardly and thereby moves the end of the shoe 11 along a cam 37 and against a shoulder 38 on the part 29, so that said shoe 11 will hold the cam lever 28 in the solid line position shown in Fig. 5 until the actuator 19 engages and moves the shoe 11 out of engagement with said part 29, at which time the spring 33 returns the cam lever 28 to the dotted line position shown in Fig. 5.

Continued movement of the shoe 11 by the actuator 19 will cause the jerk line 13 to operate the pipe tongs far enough to break the joint uniting two sections of pipe, after which slight further turning movement of the rotary member 4 engages the cam lever 23 with a cam 39 on the stationary housing 1, and said cam 39 operates the cam lever 23 to disengage the actuator 19 from the shoe 11 by turning said actuator 19 to the position shown in Fig. 1. When the actuator 19 is thus disengaged from the shoe 11, the spring 14 moves the jerk line 13, and thereby the shoe 11, to the position shown in Fig. 1, in which the shoe 11 is engaged against the end of the member 29, and this cycle of operation may be performed easily and as rapidly as adjustments and attachments of the parts, including the pipe tongs, will permit.

A plate 40 is rigidly attached to the rotary member 4 by a fastener 41 and engages the end of the actuator 19. Said plate 40 is formed with a pair of arms 42 and 43 which engage the adjacent end of the actuator 19 (Figs. 3 and 7) and thereby prevent the spring 27 from moving the actuator 19 longitudinally. The end of the cam lever 23 that is toward the plate 40 extends between the arms 42 and 43 and limits extent of turning movement of the actuator 19 by the cam lever 23, so that the latch pin 25 will unfailingly engage in the respective indentations 24. Longitudinal movement of the actuator 19 in the opposite direction is prevented by the cam lever 23 which engages the inner end of the rotary member 4.

The alternative construction shown in Figs. 8 and 9 differs from that already described only in the mounting for the shoe 44 which takes the place of the shoe 11 and is attached to the jerk line 13. The shoe 44 has flanges 45 engaging in guides 46 formed at the periphery of the rotary member 4. For insertion and removal of the shoe 44, the guides 46 are provided with gaps 47 through which the flanges 45 may be passed for mounting and removal of the shoe. The ends of the guides 46 at the sides of the gaps 47 are formed with beveled walls 48 which will pass along the flanges 45 during rotation of the rotary member 4 until the actuator 19 engages the shoe 44 in the manner already described. The stationary housing 1 prevents the shoe 44 from moving outwardly too far during return movement of said shoe 44 to its starting position by actuation of the spring 14, as already described. By this construction and arrangement, frictional engagement of the shoe 44 with the stationary housing 1 is entirely eliminated during movement of said shoe by the actuator 19. Thus, this alternative arrangement characterizes the device by greater ease of operation.

It should be apparent that this invention attains all of the stated objects and advantages efficiently and satisfactorily, and that other variations in the form and arrangement of the parts may be made without departure from the nature and principle of the invention.

I claim:

1. A cathead for operating a jerk line comprising adjacently supported substantially concentric stationary and rotary members, a shoe freely supported by one of said members for attachment to the jerk line, an actuator operably carried by said rotary member for movement relative thereto into position for operative engagement with said shoe, control means mounted on said stationary member for moving said actuator into shoe engaging position, means engageable by said shoe for holding said control means in actuator moving position for a short interval, and means supported by said stationary member for disengaging said actuator from said shoe during rotation of said rotary member.

2. Mechanism of the character described comprising a rotary member having a circumferential groove, a jerk line extending into said groove, a shoe attached to said jerk line, means for confining said shoe within said groove, an actuator carried by said rotary member for movement relative thereto into position for engaging and positively moving said shoe and thereby winding said jerk line on said member, and means connected to said actuator for moving said actuator to and from said engaging position during rotation of said rotary member.

3. Mechanism of the character described comprising a rotary member, a jerk line adapted to be wound on said rotary member, a shoe attached to said jerk line, engagement means carried by and movable relative to said rotary member for engaging and moving said shoe in a direction to wind said jerk line on said rotary member, and means actuated during rotation of the rotary member for moving said engagement means relative to the rotary member to effect a driving engagement between said engagement means and said shoe.

4. Mechanism of the character described comprising a rotary member, a jerk line adapted to be wound directly on said rotary member, a shoe attached to the end of said jerk line, a device movably mounted on said rotary member for engaging said shoe to wind the jerk line directly on said rotary member, and means supported by said rotary member for confining and guiding said shoe in cooperative relationship with said device.

5. In a device of the character described, in combination, a stationary housing, a rotary driving member mounted within the stationary housing, a shoe disposed between said housing and said driving member, a jerk line attached to the shoe, an actuator movably mounted on the driving member adjacent the periphery thereof, and means on the housing for moving said actuator for projection outwardly from the periphery of the driving member to engage and operate said shoe and wind said jerk line on said driving member.

6. In a device of the character described, in combination, a stationary housing, a rotary driving member mounted within the stationary housing, a shoe disposed between said housing and said driving member, a jerk line attached to the shoe, an actuator movably mounted on the driving member adjacent the periphery thereof for limited epicyclic movement about the center of said driving member and means for engaging said actuator with said shoe and thereby moving said shoe during rotation of said driving member to wind said jerk line on said driving member.

7. In a device of the character described, a stationary housing, a shoe supported within said housing for movement about the axis thereof, a member supported for rotation within said housing, an actuator for said shoe connected with said rotary member for movement to and from position to engage said shoe, means for holding said actuator out of position to engage said shoe during rotation of said member, a cam element supported by said housing, a device holding said cam element in ineffective position, a connection for moving said cam element to effective position in opposition to said device, and means operated by said cam element for moving said actuator to position to engage said shoe during further rotation of said rotary member.

8. In a device of the character described, a stationary housing, a shoe element supported within the housing for movement about the axis thereof, a member mounted in the housing for rotary movement therein about the axis of said housing, an actuator for said shoe connected with said rotary member, means for holding said actuator out of position to engage said shoe during rotation of said member, means for positively moving said actuator to position to engage said shoe, a device in said housing engaging and restraining said shoe in one position, a lever attached to and operated by said device, means holding said device in position to engage and restrain said shoe, a control line connected with said device for moving the same to permit slight movement of said shoe to a second position in which said shoe will hold said device in said second position, and means connected with said actuator operated by said lever for moving said actuator to position to engage said shoe when said device and said cam lever are moved as aforesaid.

9. A cathead for operating a jerk line comprising a rotary drum, a cooperating stationary housing substantially concentric with and enclosing said drum and separated therefrom by an intervening annular space, a shoe supported by said housing in said space and attached to said jerk line for winding the same directly on said drum, an actuator for said shoe movably mounted on said drum for movement into said space toward said housing to engage and operate said shoe, and means supported by said housing for effecting engagement and disengagement of said shoe and said actuator while said drum is rotating.

10. A cathead for operating a jerk line comprising a rotary drum, a cooperating stationary housing substantially concentric with and enclosing said drum and separated therefrom by an intervening annular space, a jerk line extending into said housing, a shoe attached to said jerk line and supported by said housing within said space for winding said jerk line directly on said drum, an actuator carried by said drum for optional movement outwardly into said space to engage and operate said shoe and for inward movement to release said shoe, means supported by said housing for engaging and disengaging said actuator and said shoe while said drum is rotating, and a spring mounted on said jerk line in endwise abutment with said housing for returning said shoe to position for another operation.

11. A cathead for operating a jerk line comprising a rotary drum, a cooperating stationary housing substantially concentric with and enclosing said drum and separated therefrom by an intervening annular space, a jerk line extending into said housing, a shoe supported by said housing and attached to said jerk line within said space, an actuator movably supported by said drum for movement outwardly beyond the periphery thereof into said space to engage and operate said shoe while said drum is rotating, a rock arm connected with said actuator, means supported by said housing and engageable with said rock arm for moving the same and thereby moving the actuator to position to engage said shoe during rotation of said drum, and means supported by said housing for operating said rock arm to disengage said actuator from said shoe after said shoe has been moved a predetermined distance.

12. A cathead for operating a jerk line comprising a rotary drum, a cooperating stationary housing substantially concentric with and enclosing said drum and separated therefrom by an intervening annular space, a jerk line extending into said housing, a shoe supported by said housing and attached to said jerk line within said space, an actuator movably supported by said drum for movement outwardly beyond the periphery thereof into said space to engage and operate said shoe while said drum is rotating, a rock arm connected with said actuator, means supported by said housing for operating said rock arm to move said actuator outwardly into said space to shoe engaging position, means supported by said housing for operating said rock arm to move said actuator out of engagement with said shoe after said shoe has been moved a predetermined distance, and a spring mounted on said jerk line and abutting said housing for returning said shoe approximately to the position from which it was moved by said actuator.

13. Mechanism of the character described comprising a rotary driving member having a winding surface, a stationary housing enclosing said driving member and separated therefrom by an annular space, a shoe member mounted for movement in said annular space, a jerk line extending into said housing and having one end attached to said shoe member, a device carried by said driving member, and means supported by said housing for moving said device relative to said driving member into position to engage said shoe member to effect a positive driving engagement between said driving member and said shoe member and to move said shoe member with said driving member and thereby wind said jerk line directly on the winding surface of said driving member.

14. Mechanism of the character described comprising a stationary housing, driven means having a constantly rotating annular member extending into and separated from said housing by an annular space, a shoe disposed in said space, a jerk line attached to said shoe, an actuator journalled in said annular member for movement therewith, means for moving said actuator relative to the annular member to engage and operate said shoe and thereby wind said jerk line on said constantly rotating member, and means mounted on said housing for disengaging said actuator from said shoe.

15. Mechanism of the character described comprising a driving member, a shoe, means for supporting said shoe for movement around said member, a line fixed at one end to said shoe and being adapted to be wound on said driving member by movement of said shoe around said member, an actuator supported by and movable relative to said driving member to engage and move said shoe around said member, and mechanism connected to said actuator for moving said actuator to engage and, after a predetermined movement of said member, to release said shoe.

16. Mechanism of the character described comprising a rotary driving member, a line adapted to be wound directly on said driving member, means apart from said member for supporting said line, a device supported by said driving member for movement relative thereto during rotation of said driving member to effect a driving connection between said driving member and said line supporting means to wind said line directly on said member, and means supported apart from said driving member for control by the operator to move said device to effect said driving connection as a foresaid.

17. Mechanism of the character described comprising a rotary driving member, a shoe supported apart from said driving member, a line fixed at one end to said shoe and being adapted to be wound on said driving member, a device carried by and movable relative to said driving member for engaging and releasing said shoe, a support in connection with said mechanism, an element movably mounted on said support and operable manually to position to cause the rotation of said driving member to operate said device to engage said shoe and effect a driving connection between said driving member and said shoe, and means carried by said driving member for retaining said element in operated position for a predetermined time.

18. Mechanism of the character described comprising a stationary housing, a rotary driving member extending into said housing, a jerk line, a shoe disposed between said housing and said driving member and attached to said jerk line, an actuator movably supported by said driving member and being optionally engageable with said shoe to move said shoe and wind said jerk line directly on said driving member, means connected to said actuator for moving said actuator on said rotary member to shoe engaging position, and means supported by said housing for engaging and operating said first named means to disengage said actuator from said shoe.

19. Mechanism of the character described comprising a rotary member, a shoe member supported for sliding movements adjacent to said rotary member, a jerk line attached to said shoe to be wound thereby directly on said rotary member, an actuator supported by and movable relative to said rotary member for effecting a driving connection between said rotary and shoe members, and a device operable manually to cause said actuator to be moved relative to said rotary member to position to effect a driving connection between said rotary and shoe members.

20. Mechanism of the character described comprising a rotary driving member, a shoe member supported adjacent to said driving member and having a jerk line attached thereto, means for guiding said shoe member for movement around the periphery of said driving member to wind said jerk line on said driving member, an actuator carried by and movable relative to one of said members for effecting a driving engagement between said members to cause the jerk line to be wound on said driving member, means for moving said actuator to and from engaging position, and means for latching said actuator in engaged and in disengaged position irrespective of the relative position of said driving and shoe members.

21. Mechanism of the character described comprising a rotary driving member having a circumferential groove, a jerk line, a shoe attached to the end of said jerk line, means for permanently supporting and guiding said shoe for movement inside said groove, and means supported by and movable relative to said driving member for effecting driving connection between said shoe and said driving member to move said shoe and wind said jerk line directly on said driving member.

22. Mechanism of the character described comprising a rotary driving member, a jerk line to be wound on said driving member, means forming a shoulder on said jerk line, a device supported by said driving member for movement relative thereto to a position to project from said driving member to engage and move said shoulder and thereby wind said jerk line on said driving member, and means for releasing said device from said shoulder after a predetermined movement of said driving member.

23. Mechanism of the character described comprising a rotary driving member, a flexible line to be wound on said driving member, a member for retaining said flexible line in position to be wound on said driving member, an actuator supported by one of said members for movement relative thereto, means for moving said actuator relative to the member supporting it to effect connection between said driving member and said second member, and a device for latching said actuator in said position before said connection between said driving member and said second member is effected.

JOHN H. SCHREIBER.